United States Patent [19]
King

[11] Patent Number: 5,471,378
[45] Date of Patent: Nov. 28, 1995

[54] AC TO DC CONVERTER SYSTEM WITH RIPPLE FEEDBACK CIRCUIT

[75] Inventor: Roger J. King, Holland, Ohio

[73] Assignee: The University of Toledo, Toledo, Ohio

[21] Appl. No.: 106,813

[22] Filed: Aug. 13, 1993

Related U.S. Application Data

[63] Continuation-in-part of Ser. No. 902,939, Jun. 23, 1992, Pat. No. 5,237,492.

[51] Int. Cl.$^6$ ............................................. H02M 1/12
[52] U.S. Cl. ................... 363/46; 363/80; 363/89
[58] Field of Search ............................ 363/46, 48, 80, 363/89

[56] References Cited

U.S. PATENT DOCUMENTS 3,798,531  3/1974  Allington ........................... 363/89
4,468,603  8/1984  Vander Meer et al. ............... 318/779
4,683,529  7/1987  Bucher, II ........................... 363/44

Primary Examiner—Peter S. Wong
Assistant Examiner—Adolf Berhane
Attorney, Agent, or Firm—Marshall & Melhorn

[57] ABSTRACT

A nonlinear ripple feedback circuit for use with a current-sourced rectifier system with an inductor input filter. The nonlinear ripple feedback circuit eliminates the oscillation of the rectifiers and improves the line-current waveform by sensing of and compensating for any amplitude of ripple appearing in the DC-side current. A sample of the rectified line voltage is multiplied by the product of a voltage feedback control signal times the ripple feedback signal ratio to form the input to the pulse-width modulator which produces the gating waveform for the converter of the rectifier system such that the oscillation and sensitivity of the converter system is reduced, and the AC line current waveform has low distortion, regardless of the DC-side ripple current levels.

18 Claims, 9 Drawing Sheets

5 ms/div 5 ms/div

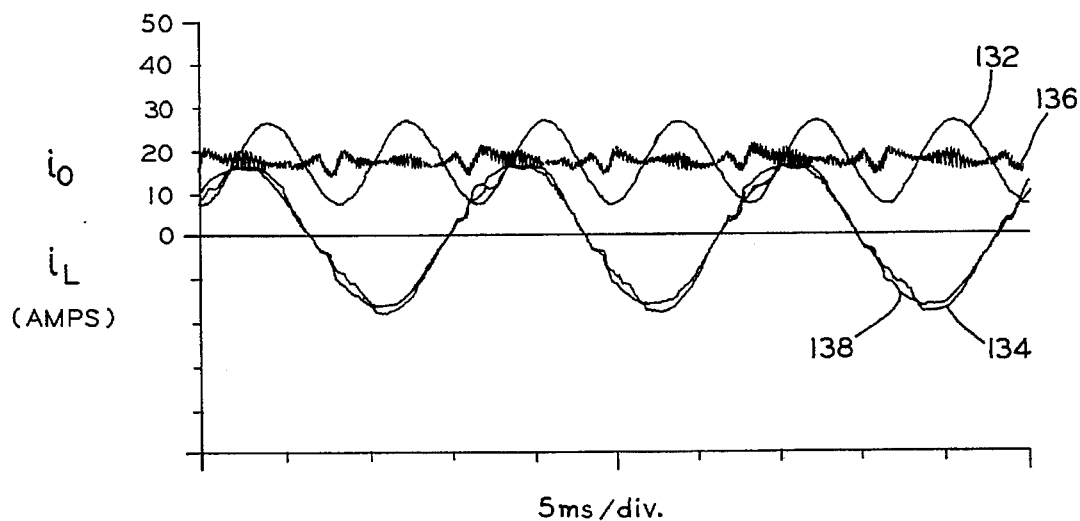
FIG. IIA
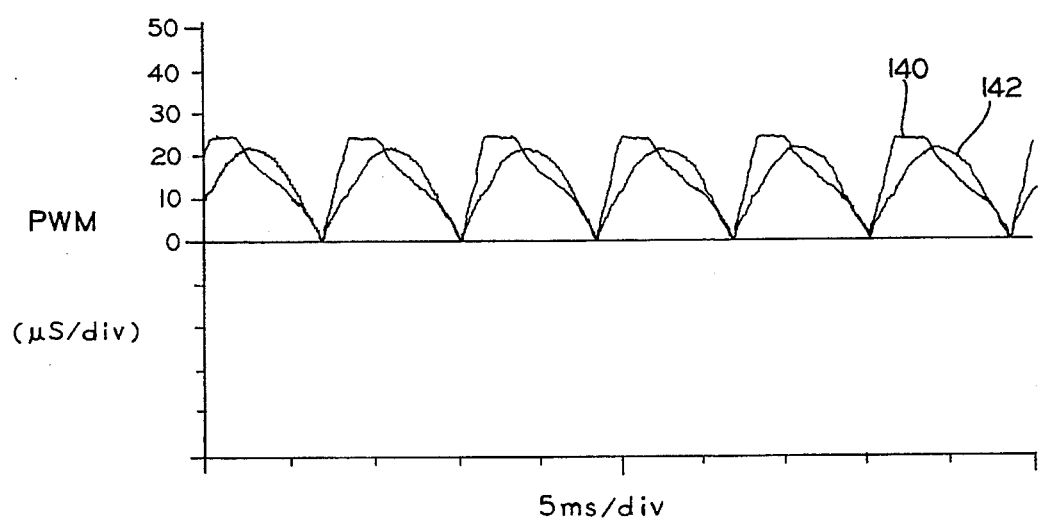
FIG. IIB

AC TO DC CONVERTER SYSTEM WITH RIPPLE FEEDBACK CIRCUIT

This application is a continuation-in-part of application Ser. No. 07/902,939, filed on Jun. 23, 1992, to be issued as U.S. Pat. No. 5,237,492.

BACKGROUND OF THE INVENTION

1. Field of the Invention

The present invention relates to AC to DC converter system with a ripple feedback circuit, and in particular, to a unity power factor, single phase rectifier system provided with a ripple feedback circuit to improve the AC current waveform and reduce the high frequency oscillation.

2. Summary of Related Art

The proliferation of line connected equipment using single phase rectifiers to process AC input power is a concern because of the poor power factor of the typical rectifier and the harmonic content of the AC line current of the rectifier.

Poor power factor results in poor utilization of the available current carrying capacity of the AC distribution system. High harmonic content in the line current frequently causes mutual interference among line-connected equipment. Distribution systems feeding a large rectifier or a large number of small rectifiers may experience over-heating of transformers, interference with relaying and metering, and interference with other equipment. Because of this problem, standards agencies, such as the International Electrotechnical Commission, are preparing and promoting standards for harmonic reduction.

In response to the concerns noted above, a number of high power factor rectifier systems have been developed for single phase systems having power ratings as high as 10 kilowatts. Various techniques have also been developed to reduce rectifier harmonic levels for single phase operation. Passive filters on the AC power supply and choke input filters for the rectifier system have achieved only limited success in reducing harmonic levels and are bulky and expensive.

In computer power supplies and other applications requiring a low output ripple, voltage-sourced (boost-like) rectifier systems provided with two conversion stages are used to achieve reduced harmonic levels, low output ripple, and a high level of internally-stored energy for sustaining the system during a momentary power failure. The voltage-sourced rectifier systems are characterized by DC output voltages higher than the peak AC voltage and by complicated controls for stable operation. The voltage-sourced rectifier system is also a popular system because of the availability of economical capacitors to achieve the stored energy requirements at typical AC system voltages. However, voltage-sourced rectifier systems cannot be short circuit protected and may not be suitable at higher power ratings.

For applications able to utilize a modest ripple requirement, such as a DC motor drive, a single stage rectifier system is preferable for reducing harmonic levels provided short-circuit current limiting can be obtained. A current-sourced, buck-like rectifier system meets such a requirement.

The current-sourced rectifier system includes a large inductor to provide the required energy storage and can operate at open loop or can be made current limited down to zero output voltage. The maximum output voltage for the current-sourced rectifier system is one-half the peak AC voltage. The current-sourced rectifier system is very effective in reducing harmonics and permitting full utilization of the semiconductors, even at medium and high power ratings. A costly and bulky inductor required by the current-sourced rectifier is the major drawback for the current-sourced system.

A resonant filter may be added to the current-sourced rectifier system to lower the peak stored energy, which consequently reduces the size and cost of the inductor. The resonant filter current-sourced rectifier system is also short circuit current limiting. One additional advantage of the current-sourced rectifier system is the ease in adding an isolation transformer to the system. No new conversion stages are required.

However, the use of a resonant filter with a current-sourced rectifier system results in two new problems. The AC line current distortion is quite sensitive to any distortion in the distribution system voltage. The line inductances typical of a weak AC system can also cause ringing or sustained oscillation of the rectifier.

Feedback of the ripple in the output current to the pulse width modulator used to control the gated switch increases the incremental output resistance of the converter to damp the oscillation, but it also deteriorates the AC line current waveform. The ripple feedback circuit of the present invention, minimizes the effect of these two problems.

The current-sourced rectifier system having a resonant load-balancing filter and ripple feedback circuit is not a universally useful solution, but in certain applications such a system will very beneficial. The areas of greatest utility will be (1) applications requiring normal operation down to zero output voltage, or short circuit tolerance; (2) applications which can accept a current ripple of two percent or greater; and (3) applications which need galvanic isolation, using a high-frequency transformer, in a simple single stage power circuit.

Examples of applications for which the current-sourced rectifier system having a resonant load-balancing filter and ripple feedback circuit would be advantageous include DC motor drives (shunt or series), battery chargers, electroplating power supplies, welding power supplies, and arc discharge lighting power supplies.

SUMMARY OF THE INVENTION

In accordance with the present invention, there is provided a nonlinear ripple feedback circuit for use with a current-sourced rectifier system having a inductor input filter or other load filter. The ripple feedback circuit eliminates the oscillation of the rectifiers and improves the line-current waveform regardless of the amplitude of the output current ripple, provided that the signal levels lie within the designed capabilities of the rectifier.

The rectifier system includes a bridge rectifier combined with a gated switch controlled by a pulse width modulator. Ripple current is present on the DC side of the rectifier system. The DC-side voltage includes a second harmonic component which is supported by the parallel resonant filter, or a finite-valued inductor. The use of a small inductor to support the second harmonic voltage permits a more economical design; the resonant filter permits tighter current-ripple specifications to be met.

Two problems often occur with the use of a current-sourced rectifier system with resonant filter. The rectifier system is sensitive to AC line voltage distortion resulting in a distorted line current, and AC line inductance provokes oscillation of the system. Any AC voltage harmonics cause small DC voltage harmonics which differ from the second harmonic predicted under ideal operation, thus exciting large current response in the resonant filter and large distortion currents on the AC side of the rectifier bridge. Raising the series resonant frequency and damping the series resonance in the resonant filter reduces the line sensitivity.

The nonlinear current-ripple feedback circuit of the present invention eliminates instability of the rectifier system and reduces the sensitivity of the system to a distorted AC line voltage. A sample of the rectified line voltage is multiplied by the feedback control voltage to form the input to the pulse-width modulator which produces the gating waveform. The ripple feedback of the present invention senses the DC and ripple components of the output current and combines these components with the feedback control voltage at the input to the multiplier.

One of the primary objectives of the current-sourced rectifier system with resonant filter and ripple feedback is to provide a rectifier system which is readily short-circuit protected. In many applications, the rectifier system should be capable of operating at zero output voltage.

Additional objectives of the rectifier system include maximizing the semiconductor utilization, providing a high-frequency isolation transformer without additional conversion stages, and achieving a fast transient response due to low stored energy.

An alternative embodiment of the current-sourced rectifier system includes an inductor-input filter for use in applications involving variable line frequency or low output voltage for which the AC resonating capacitor may not be readily available. The filter utilizes a nonlinear inductor sized to provide sufficient incremental inductance at the load current to keep the ripple current to a tolerable level. The ripple levels are generally large such that the small-signal analysis for the linear ripple feedback system is inadequate. The alternative embodiment includes a nonlinear feedback system which provides an exact cancellation of the effects of DC-side current ripple on the AC waveforms. The cancellation is practical for current ripple of approximately 50% of the DC current.

An object of the control circuit with nonlinear ripple feedback is to produce an accurate ripple cancellation over a wide range of operating points, and eliminate the need for a compromise feedback gain setting. The nonlinear ripple feedback control system will extend the benefits of the buck unity-power-factor rectifier system to applications requiring the inductor-input filter, such as variable line frequency or low output voltage applications.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 11 is a graph showing the gating waveforms and the current waveforms before and after the inclusion of the nonlinear ripple feedback circuit with a resonant filter and an inductor-input filter.

DESCRIPTION OF THE PREFERRED EMBODIMENT

Figure 1:
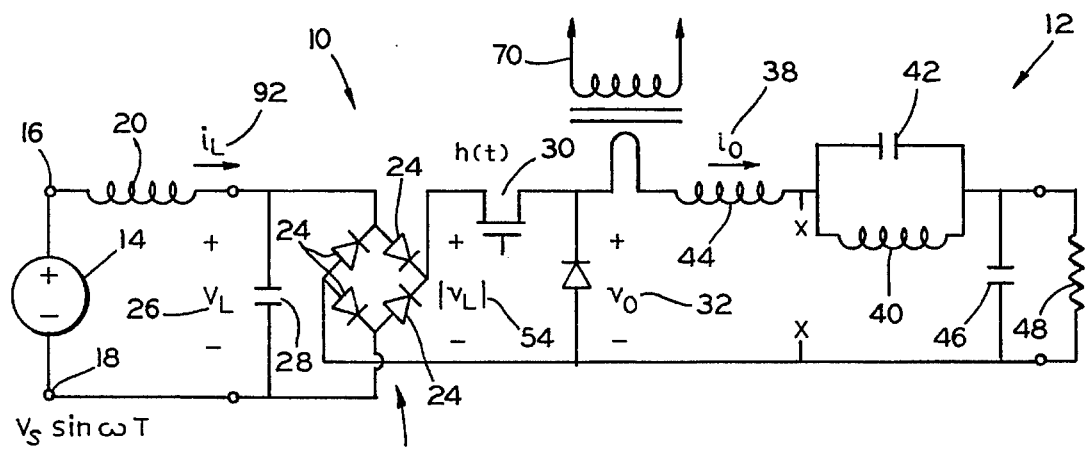
FIG. 1 is a simplified schematic of current-sourced rectifier system with a resonant filter as known in the prior art.

Referring now to the drawings, there is shown in FIG. 1 a typical current-sourced rectifier system 10 including a resonant filter 12. The system 10 is connected to a single phase AC power supply voltage source 14 at terminals 16 and 18.

Unity power factor operation of a rectifier system 10 from a single phase AC system requires energy storage capabilities. The resonant filter 12 supplies the required energy storage for unity power factor operation.

The rectifier bridge 22 for the current-sourced rectifier system 10 utilizes four diodes 24, the commutation of the diodes 24 being controlled by the AC line voltage 26. The capacitor 28 on the AC-side of the system 10 is intended to carry the switching frequency current. If the ratio of switching frequency to line frequency is large, its line frequency current becomes negligible. The inductor 20 completes a switching-frequency filter, and includes the AC source impedance.

The system 10 includes a metal-oxide-semiconductor field-effect transistor (MOSFET) switching converter 30 at the output of the rectifier bridge 22. Other gated switches, such as a insulated gate bipolar transistor (IGBT), may also be used. The maximum output voltage 32 of the current-sourced system 10 is one half the peak AC voltage source 14. The reduced voltage provides certain advantages and cost benefits when selecting a switching converter 30 because of the on-resistance advantage of lower voltage MOSFET's.

Figure 2:
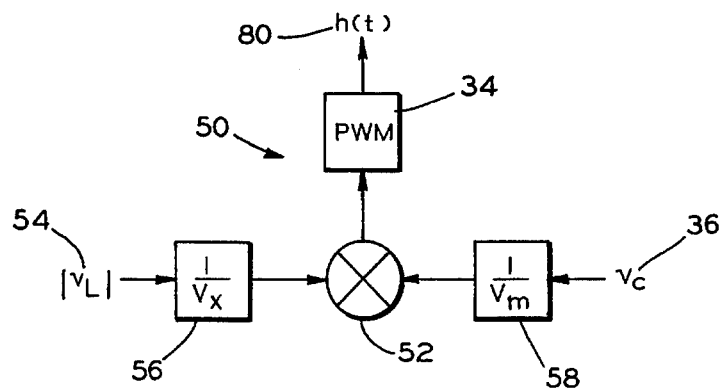
FIG. 2 is a block diagram of the gating waveform generator for the gated switch in the rectifier system as known in the prior art.

The signal for the switch gating function h(t) is generated by a standard sine-sawtooth pulse width modulator 34 shown in FIG. 2. A rectified replica of the AC line voltage 26 is multiplied times the control voltage 36 and applied to a standard pulse width modulator 34. A control variable allows for adjustable power flow such that the DC output voltage 32 is adjustable from zero to one-half the peak AC voltage source 26.

The output current 38 on the DC side of the rectifier bridge 22 includes a ripple component due to a finite filter input impedance at the second harmonic frequency. Since the ideal performance is obtained when the output current 38 has zero ripple, it is desirable that the resonant filter 12 be provided with a large second harmonic input impedance to minimize the ripple current.

In the resonant filter 12 of the present invention, the inductor 40 and capacitor 42 are parallel resonant at twice the line frequency, providing an input impedance pole at this frequency. This permits a much smaller inductor 40 to be utilized on the DC side of the rectifier bridge 22. The other inductor 44 on the output side of the rectifier bridge 22 is designed to impede switching frequency currents. A capacitor 46 mounted in parallel with the load 48 completes the switching frequency filter.

FIG. 2 shows a block diagram of the gating waveform generator 50 known in the art. The pulse width modulator 34 controls the gating waveform and includes an analog multiplier 52 having two inputs. A sample of the rectified line voltage 54 is multiplied times the control voltage 36. The pulse width modulator multiplier gain coefficients are given by the maximum expected amplitude 56 of the line voltage, and by the control voltage 58 which produces the maximum possible duty factor in the gating waveform.

Figure 3:
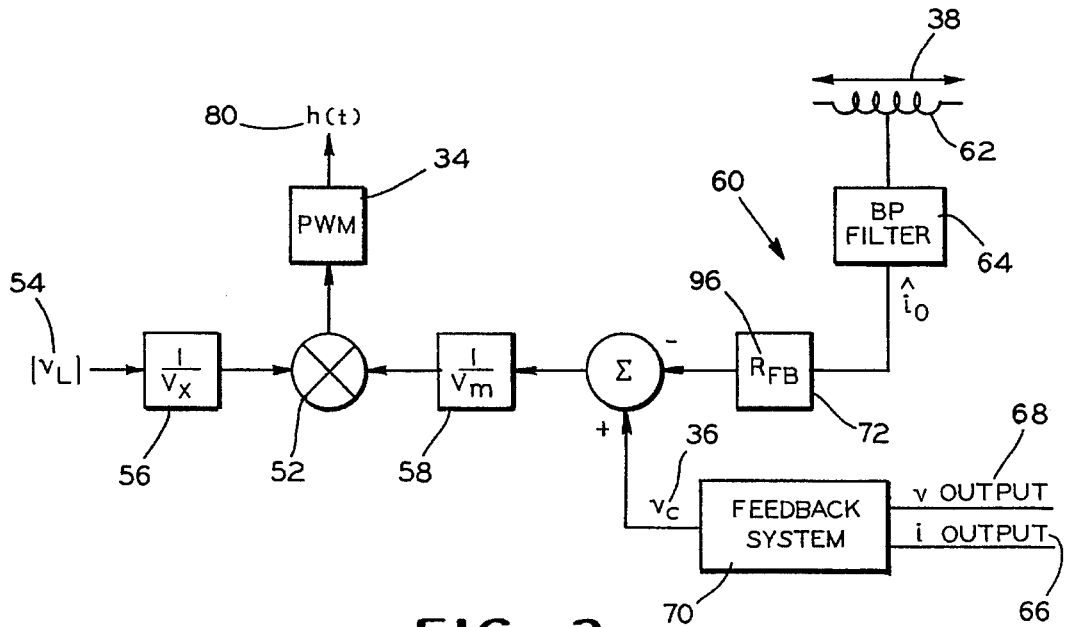
FIG. 3 is a block diagram of the gating waveform generator for the gated switch in the rectifier system including the ripple feedback of the present invention.

The ripple feedback circuit 60 of the present invention is shown in FIG. 3. The low frequency AC components of the output current 38 are detected by the use of a current transformer 62. A filter 64 uses high-pass filtering to remove the DC component and low pass filtering to remove the switching frequency components. The sensed perturbance of the output current 38 is subtracted from the control voltage 36, which is then input into the multiplier 52 for the pulse width modulator 34.

The lower frequency corner of the band pass filter 64 is needed to eliminate direct current from the ripple feedback path. The upper corner is used to eliminate switching frequency ripple. The lower corner should be positioned at about the bandwidth of the current or voltage regulating loop 66 and 68. The upper corner must be high enough to include the series resonant frequency of the resonant filter 12, but low enough to exclude switching frequency ripple.

Figure 4:
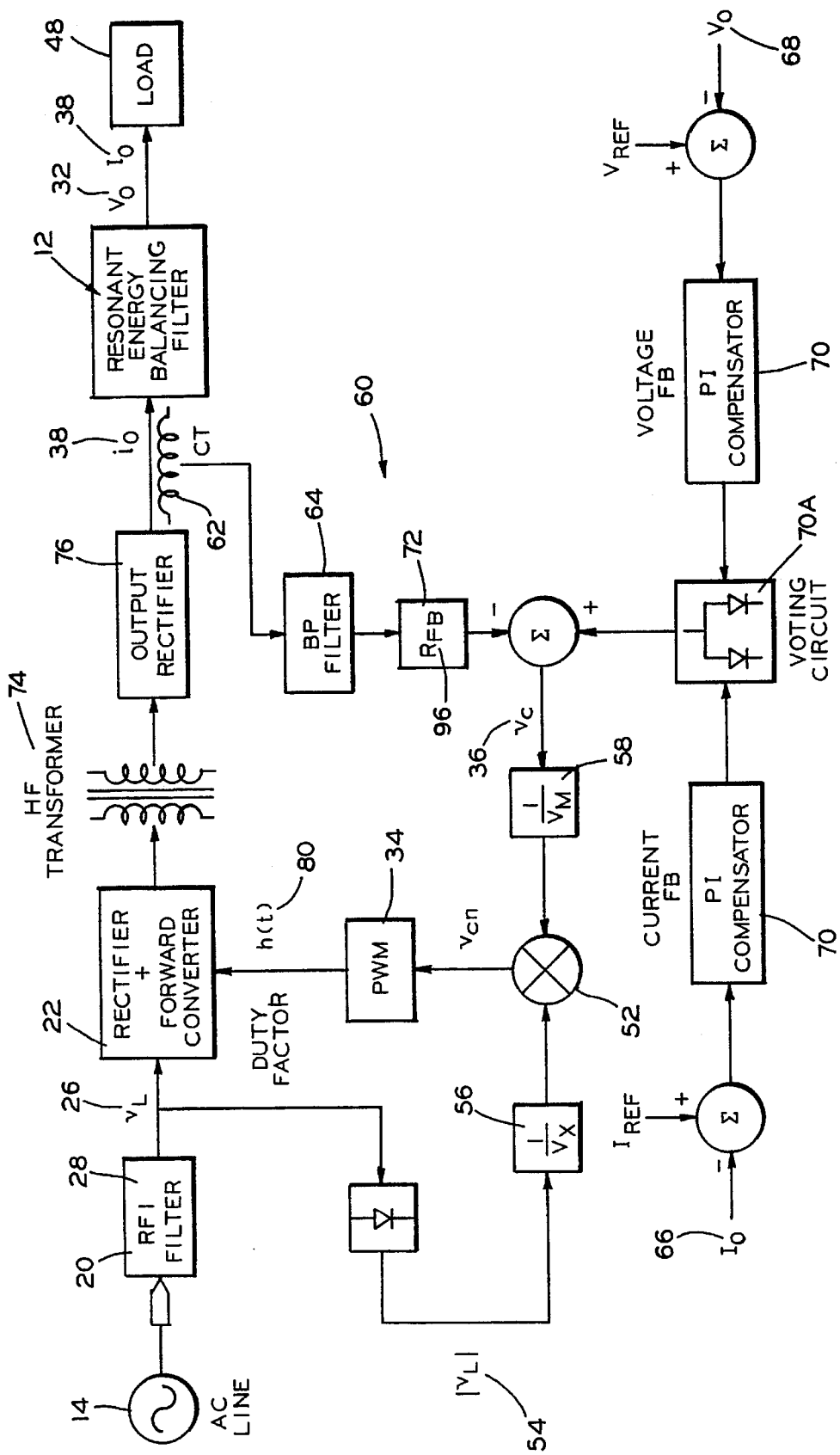
FIG. 4 is a block diagram of the current-sourced rectifier system with resonant filter and ripple feedback.

FIG. 4 shows a block diagram of a practical implementation for the current-sourced rectifier system 10 shown in FIG. 1 combined with the ripple feedback control shown 60 in FIG. 3. Control of the rectifier system 10 is achieved by multiplying the rectified line voltage 54 by the ripple feedback adjusted control voltage 36. The control voltage 36 is obtained from a standard negative feedback regulating circuit 70. The block diagram in FIG. 4 includes both a current regulating circuit 66 and a voltage regulating circuit 68 for use in generating the control voltage 36. A voting circuit 70A is furnished to enable either the voltage regulating circuit 68 or the current regulating circuit 66 for generating the control voltage 36 signal.

The ripple feedback circuit 60 includes a current transformer 62 for measuring the AC components of the DC output current 38. The output current is processed through a band pass filter 64 and a ripple feedback gain 72 before the output current 38 is subtracted from the control voltage 36 developed by the current or voltage feedback circuits 66 and 68.

FIG. 4 also discloses an optional feature which may be included with the current-sourced rectifier system. An isolation transformer 74 with output rectifier 76 may be utilized to provide high frequency isolation protection to the load 48.

Figure 5A:
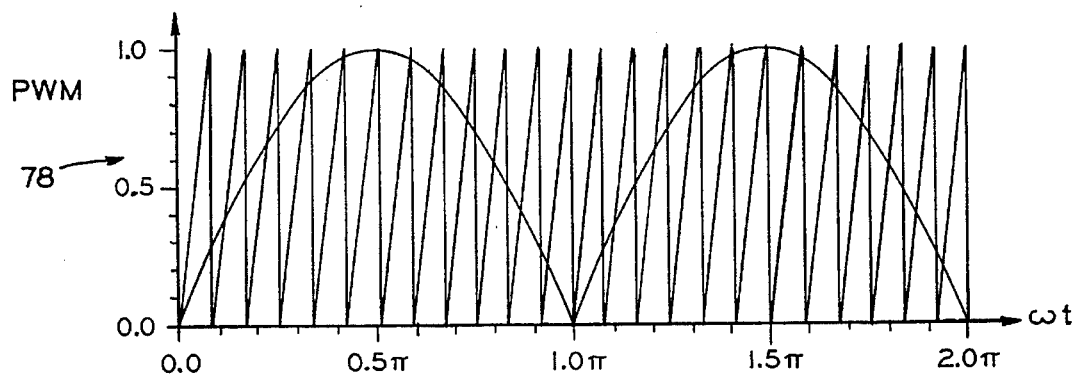
FIG. 5 is a graph of the idealized waveforms for the current-sourced rectifier system.
Figure 5B:
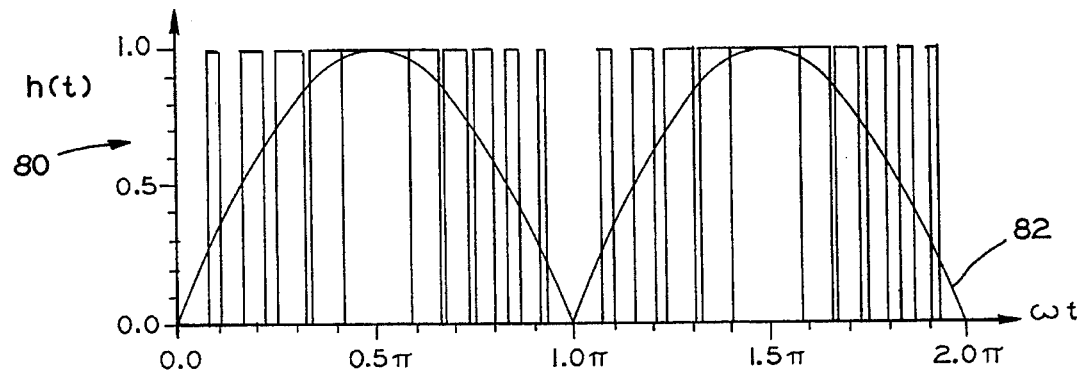
Figure 5C:
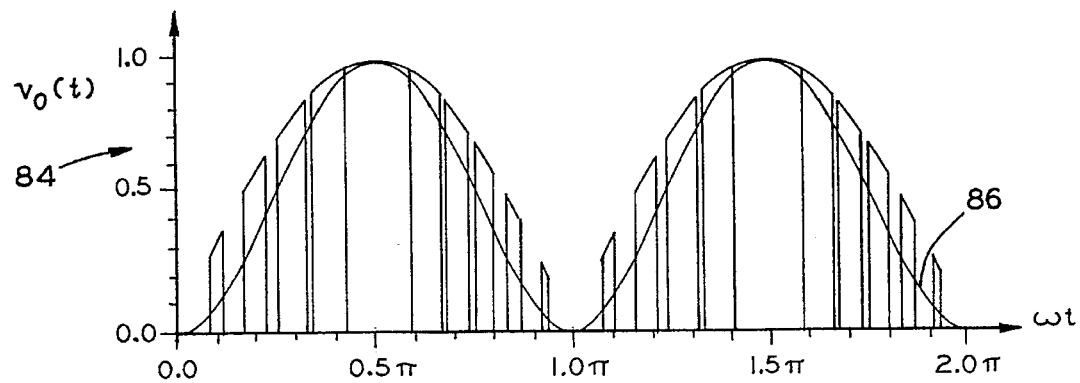
Figure 6A:
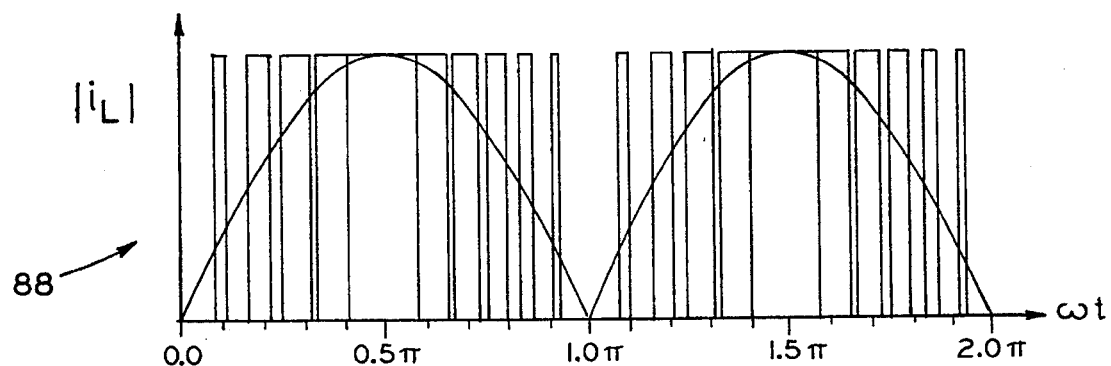
FIG. 6 is a graph of the AC side line current.
Figure 6B:
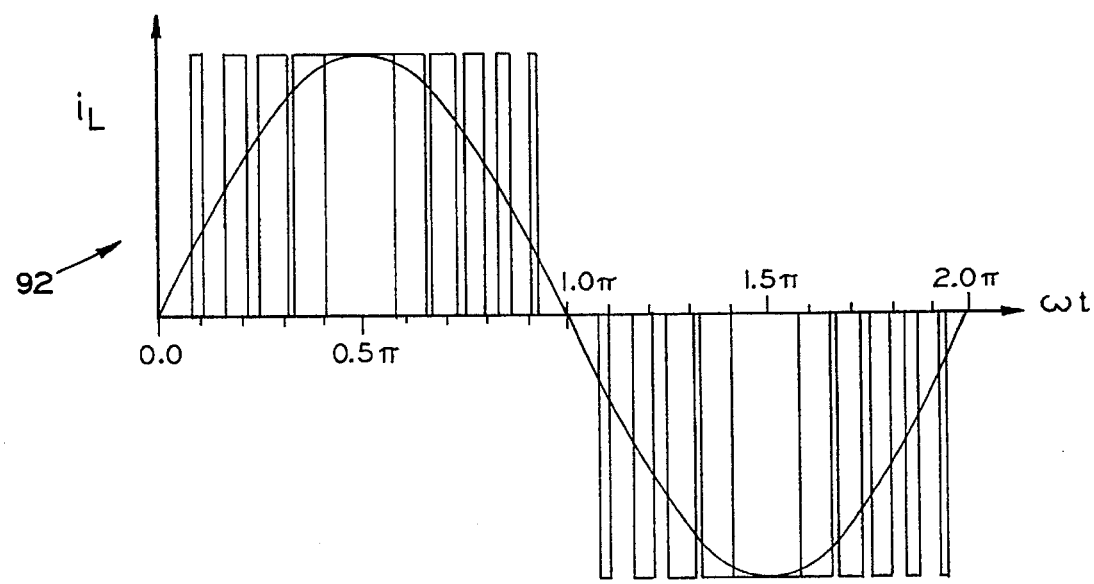

In FIGS. 5 and 6, a set of idealized waveforms for the current-sourced rectifier system 10 are shown. The top waveform 78 in FIG. 5 displays the signals present with a standard sine-sawtooth pulse width modulator 34. The pulse width modulator 34 generates the switch gating function h(t) 80 shown in the middle waveform of FIG. 5. The low frequency content 82 of function h(t) 80 is also indicated.

The bottom waveform in FIG. 5 shows the output voltage $v_o(t)$ 84 and the low frequency component 86 of the output voltage. The output voltage 84 features a varying amplitude with varying pulse widths. The resonant filter 12 on the DC side of the system 10 removes the switching frequency and the second harmonic components from the output voltage 84.

In FIG. 6, the top waveform 88 shows the current in the switch 30 and the bottom waveform 90 shows the line current on the AC side of the rectifier system. The waveforms in FIG. 6 assume a properly filtered DC-side current. The low frequency content of the current is a sinusoid at the AC line frequency.

In an incremental analysis of the system, the AC line current 92 and the output current 38 are defined by equations containing the expected cyclic steady-state results plus incremental terms representing perturbances from the steady state. The ripple feedback circuit 60 of the present invention detects the low frequency components of the output current 38. High pass filtering is utilized to remove the DC component and low pass filtering is utilized to remove the switching frequency component. The sensed perturbance in the output current 38 is then subtracted from the control voltage 36.

The optimum feedback gain (Rfb) 96 is generally equal to the control voltage 36 divided by the output current. Because the control voltage 36 and the output current vary with the operating point, the feedback gain 96 can only be optimized at a given operating point. However, a fixed value for the feedback gain 96 has been found to produce improved operating results over a wide range of output current and output voltage.

As an example, but in no way to be considered as limiting the invention, the following component values are appropriate to a particular embodiment:

power circuit—500 watts, 50 khz

AC line inductance 20—0-8 mH

AC bypass capacitor 28—5 μF

Swi.-freq. inductor 30—600 μH

120 Hz. inductor 44—36.6 mH

120 Hz. capacitor 42—48 μF

Output capacitor 46—200 μF

The ripple feedback 60 may be implemented using an AC current transformer 62 with a low-pass network on the secondary of the transformer. In the alternative, a Hall-effect current sensor 78 with a band pass network may be used to supply a signal to the ripple feedback circuit.

Figure 7A:
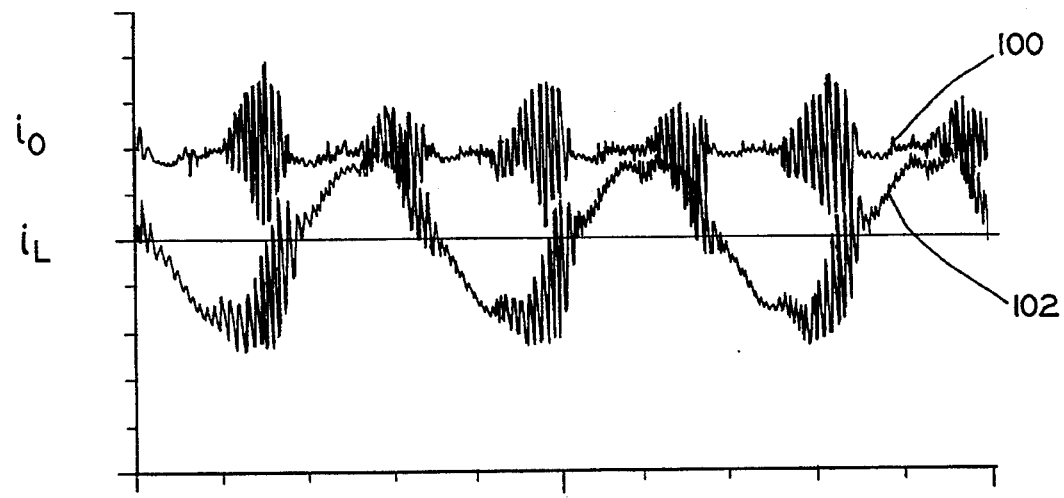
FIG. 7 is a graph showing the current waveforms before and after the inclusion of the ripple feedback circuit.
Figure 7B:
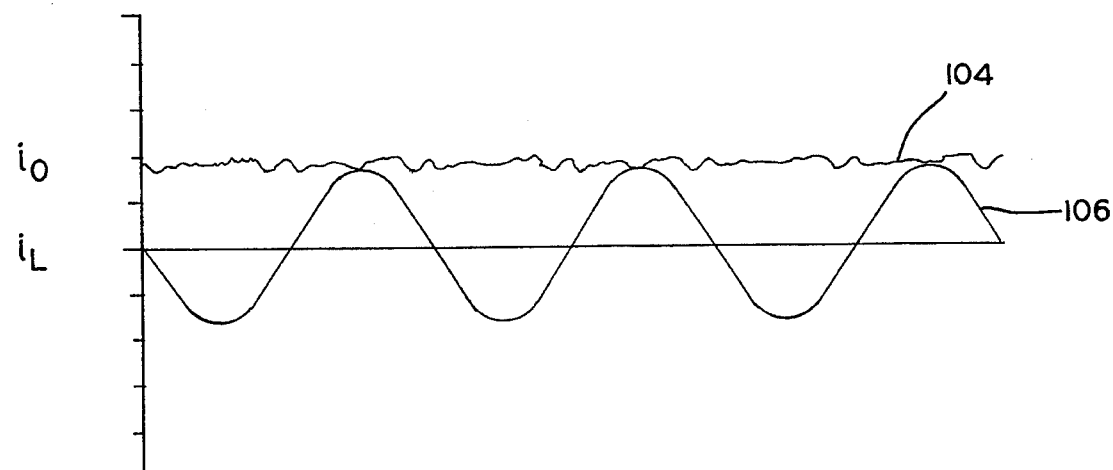

FIG. 7 shows two sets of wave forms for this circuit with 1.3 mH of AC line inductance. The upper pair of waveforms displaying the rectifier DC current 100 and the AC line current 102 without ripple feedback. The lower pair of waveforms in FIG. 7 are the DC current 104 and the AC line current 106 under the same loading conditions with ripple feedback 60. The feedback can be seen to effectively damp the anticipated oscillations.

Thus, there has been provided a unique AC to DC rectifier system 10 including a ripple feedback circuit 60. The rectifier system 10 may be used in applications having a modest ripple specification, but requiring short circuit protection. The resonant filter reduces the size of the low frequency inductor required. The ripple feedback circuit 60 of the present invention eliminates oscillation of the rectifier system and reduces the sensitivity of the rectifier system to a distorted AC line voltage.

The above embodiment of the ripple feedback is a linear system which is suitable only for small amounts of ripple, and which requires an adjustment of the gain, based on the size of the load, to obtain the optimum value.

Figure 8:
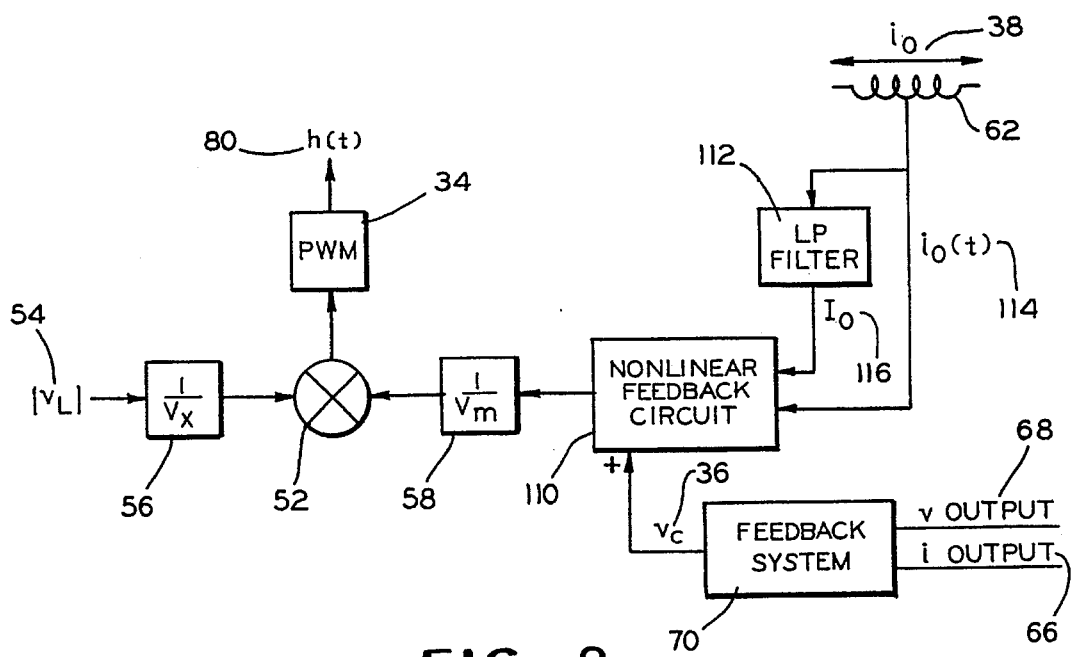
FIG. 8 is a block diagram of an alternate embodiment of the gating waveform generator for the gated switch in the rectifier system including the nonlinear ripple feedback of the present invention.
Figure 9:
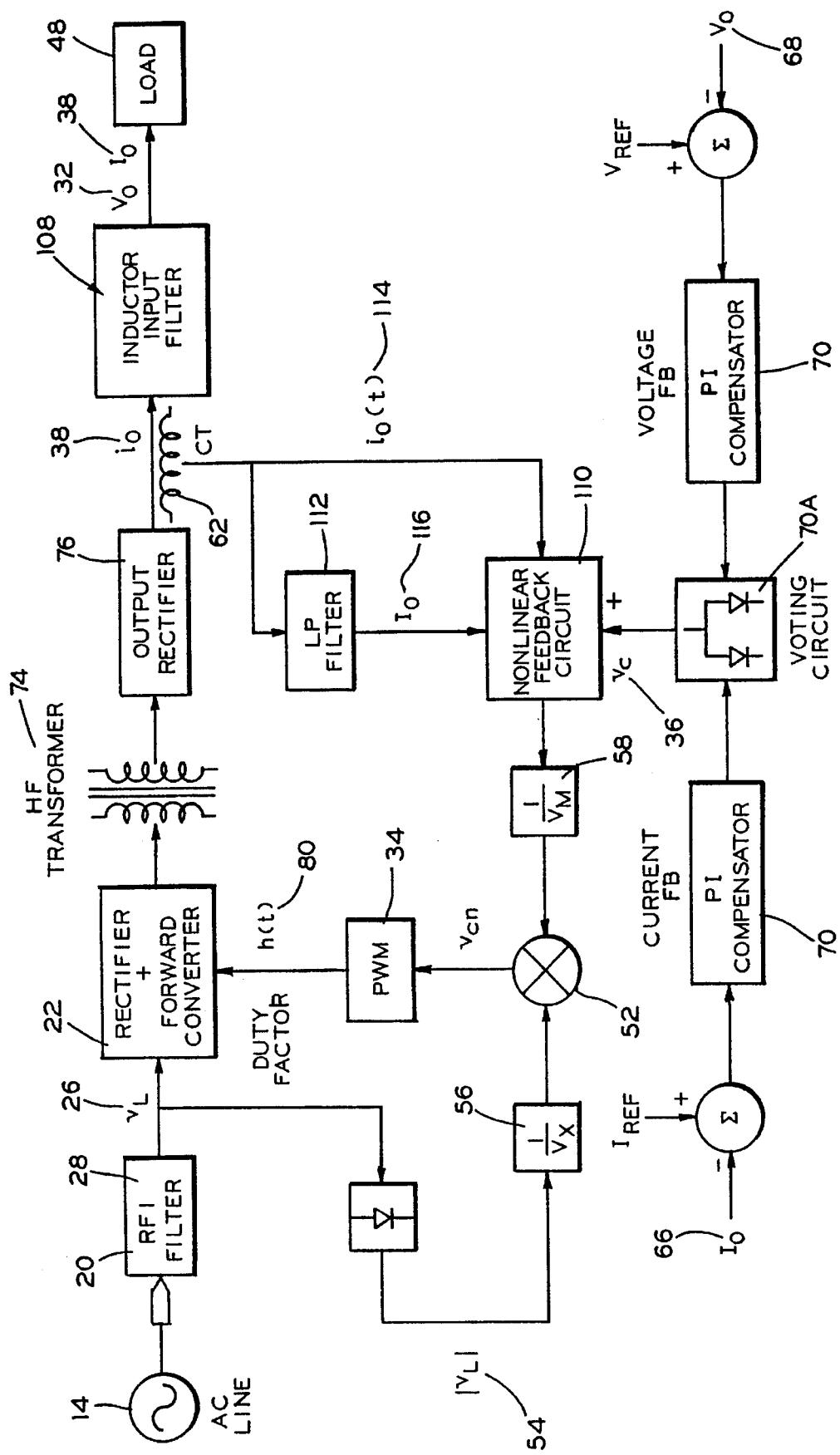
FIG. 9 is a block diagram of the current-sourced rectifier system with inductor-input filter and nonlinear ripple feedback.

A second embodiment, as shown in FIGS. 8 and 9, utilizes an inductor-input filter 108, or other similar filter, and a nonlinear feedback circuit 110 to process large amounts of ripple at the optimum incremental gain. Although the linear ripple feedback circuit of the first embodiment provides good suppression of the ripple for small signal conditions, the current sourcing inductor for filter 108 is usually sized at a minimal value, which produces larger ripple.

For the nonlinear ripple feedback system, the buck rectifier is the same circuit as shown in FIGS. 1 and 4, except that an inductor-input filter 108 and nonlinear feedback circuit 110 with a low pass filter 112 are used instead of the resonant filter 12 and a linear feedback circuit 36, 72, 96 with a band pass filter 64. Adjustment of the feedback gain factor 96 is not required in the nonlinear ripple feedback circuit, which makes the nonlinear circuit preferred over the linear circuit for possible use in a general purpose integrated circuit.

Two versions of the DC-side current, $i_o(t)$ and $I_o$, are required for input into the nonlinear feedback circuit 110. $i_o(t)$ 114 is the sensed current which is low-pass filtered to remove switching-frequency ripple. $I_o$ 116 is low-pass filtered by filter 112 to remove all components related to the AC line frequency. The low pass filter 112 has a corner frequency comparable to the crossover frequency of the load-regulating control loops, generally below 10 hertz. The inductor-input filter 108 includes an inductor connected in series with the load and a capacitor connected in parallel with the load for impeding switching-frequency and twice-line-frequency currents.

The nonlinear feedback requires that the low bandwidth control voltage $v_c$ 36 be multiplied by a ripple feedback signal equal to the ratio of $I_o$ to $i_o(t)$, the low bandwidth version of the output current $I_o$ 116 to the wide-bandwidth version of the output current $i_o(t)$ 114. All signals have the same polarity and a one-quadrant multiplier/divider may be used. The transmission of current ripple from the DC to the AC side of the rectifier 22 is nulled by the nonlinear ripple feedback adjustment to the control voltage.

The averaged gating function 80 is constrained such that h(t) is between 0 and 1. For a high voltage, low current condition, for which the instantaneous $i_o$ will approach zero, the pulse width modulator 34 will saturate when the control voltage 36 causes the constraint to be violated. The nonlinear ripple feedback is particularly appropriate for use with the inductor-input filter 108, in which case the ripple current is almost entirely second harmonic and lagging the applied voltage by ninety degrees.

Figure 10A:
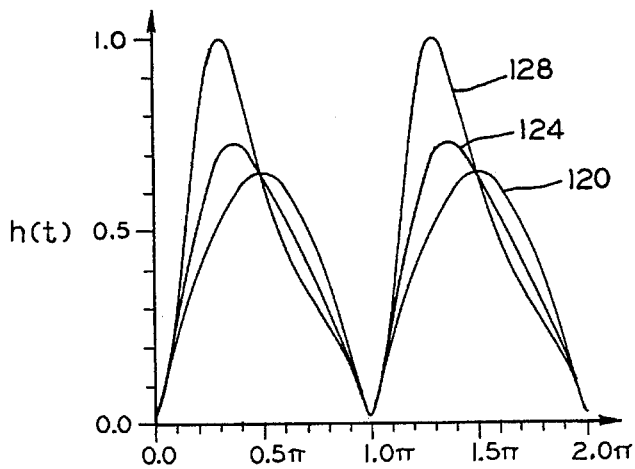
FIG. 10 is a graph of the waveforms for the averaged switching function and output voltage for normalized current ripple magnitudes of 0%, 25%, and 50%.
Figure 10B:
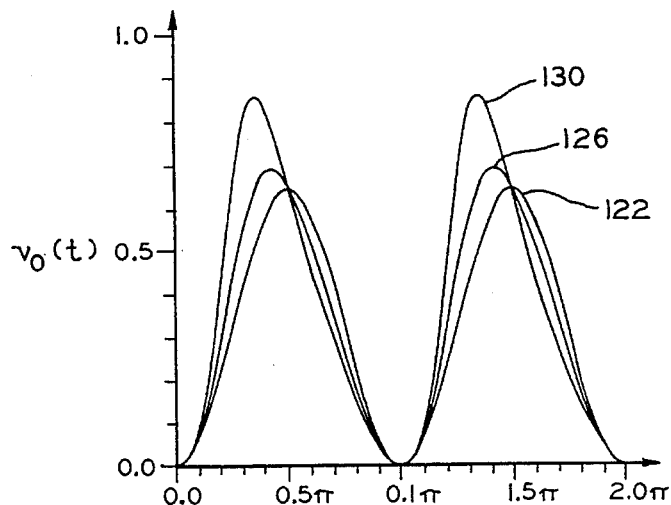

FIG. 10 shows the gating function h(t) 80 plotted for normalized current ripple magnitudes of 0%, 25%, and 50% with the control voltage 36 set such that the peak value of the gating function h(t) for 50% ripple is 1.0. Complete ripple correction depends on designing sufficient headroom for the gating function to prevent saturation of the pulse width modulator 34.

FIG. 10 also shows one cycle of the resulting DC-side voltage waveforms for the same ripple magnitudes. The average DC voltage shifts somewhat with the application of the feedback. The 0% ripple magnitude results in a gating function waveform 120 and voltage waveform 122. The 25% current ripple provides an increase of 12% in the peak gating function, waveform 124, and a 3% increase in the DC output voltage, waveform 126, relative to the 0% ripple case. With 50% ripple, there is a 55% increase in the gating function, waveform 128, and a 16% increase in the output voltage, waveform 130.

FIG. 11 displays two sets of waveforms obtained for operation of a circuit used for a battery charger, the circuit having a full-power operation at 56 volts and 18 amps. The first graph in FIG. 11 includes the DC-side current 132 and the AC line current 134 for the inductor input filter 108 and the DC-side current 136 and the AC line current 138 for the resonant filter 12. The nonlinear feedback circuit 110 is used for both filters. The second graph shows the averaged gating waveforms for the inductor-input filter 140 and the resonant filter 142.

The DC-side current 136 for the resonant filter is characterized by little low frequency ripple, but includes visible switching frequency content and some higher order harmonics of the 60 hertz line frequency. The gating waveform 142 for the resonant filter is a nearly perfect rectified sinusoid because the nonlinear ripple feedback produces a relatively small correction factor due to the inherently low ripple content of the filter current.

The waveforms for the inductor-input filter 108 is based on an inductance of 7 mH at 18 amps. Approximately 55% ripple is apparent in the dc-side current waveform, and the action of the nonlinear ripple feedback is seen in the gating waveform 140, which is markedly modified from the rectified sinusoidal shape. However, the Ac line current 134 remains a low distortion sinusoid.

Figure 12A:
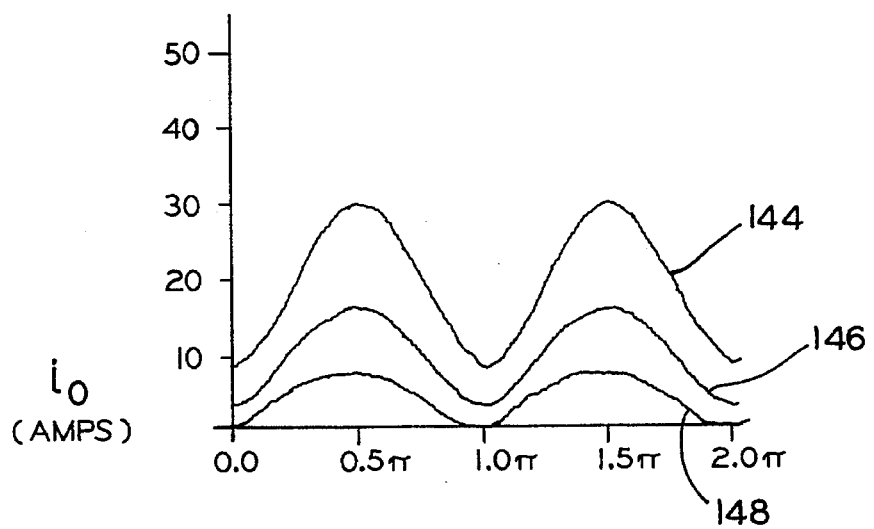
FIG. 12 is a series of waveforms for a rectifier system with inductor-input filter.
Figure 12B:
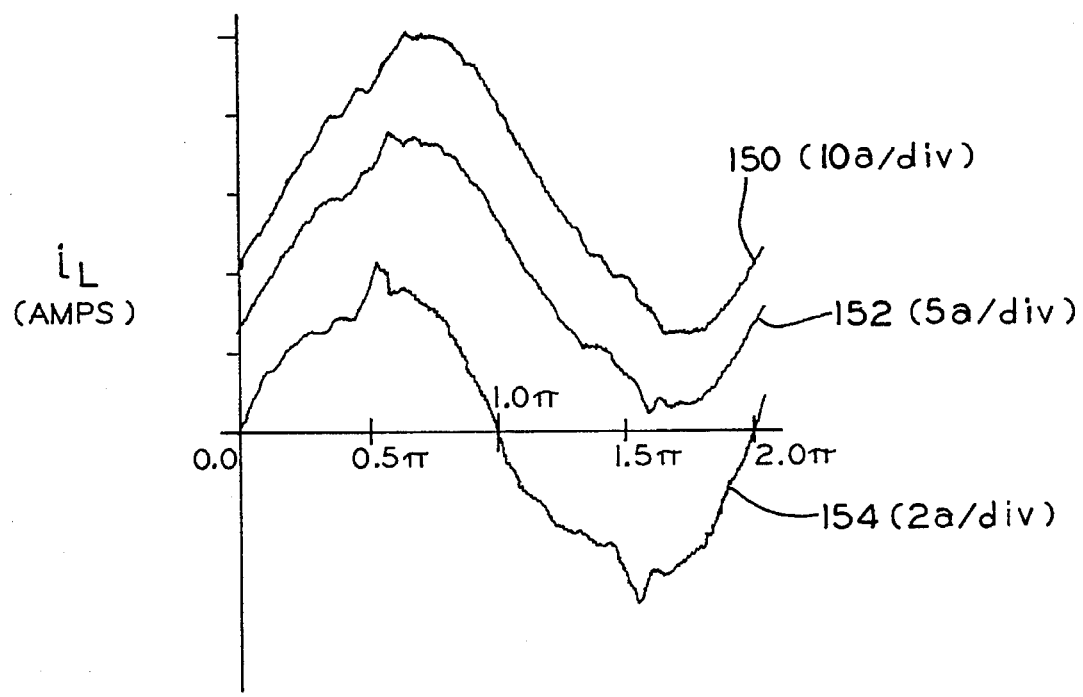

FIG. 12 displays a series of waveforms from a circuit with the inductor input filter 108 and three different DC current levels, 18, 9, and 3.6 amps. The first graph shows the inductor waveforms 144 (10 amps), 146 (5 amps), 148 (3.6 amps) at a DC voltage of 56 volts. The second graph shows the AC line currents 150, 152, 154, for the three current levels, with scale factors in direct proportion to the corresponding DC current levels. The waveforms show that the rectifier conduction becomes discontinuous as the load current is reduced. Although the gating waveform must saturate for an increasing portion of the cycle as the inductor current is reduced, the AC line current waveform remains satisfactory.

The nonlinear ripple feedback circuit 110 compensates any amplitude of ripple appearing in the DC-side current, up to the saturation limit designed into the pulse width modulator 34. For small signals, the action of the nonlinear ripple feedback system is identical to that the first embodiment with the resonant filter 12 and the gain factor 96. The nonlinear ripple feedback circuit produces an accurate ripple cancellation over a wide range of operating points and produces positive damping for any series resonance which may appear in the DC-side filter, thus reducing its response to AC voltage distortion.

Although exact ripple compensation cannot be maintained as the rectifier enters a discontinuous conduction mode of operation, a very acceptable AC line current waveform is maintained. This permits considerable economy is sizing the inductor 108.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An AC to DC converter system for supplying DC electrical power to a load, comprising:
   a) input means for receiving an AC power supply having an AC line frequency;
   b) filter means connected to said input means for suppressing the transmission of a switching frequency current to the AC power supply;
   c) rectifier means connected to said filter means for converting the AC power supply to a DC power supply for transmittal to a load;
   d) filter means connected between said rectifier means and the load for providing the energy storage required for unity power factor operation;
   e) control means connected to said rectifier means for controlling the DC power supply transmitted to the load; and
   f) nonlinear ripple feedback means connected to said control means for sensing a current ripple in the DC power supply and providing a feedback signal to said control means, whereby a sinusoidal AC line current is maintained.

2. The converter system defined in claim 1 wherein said rectifier means includes a current-sourced rectifier.

3. The converter system defined in claim 1 wherein said rectifier means includes a pair of input terminals, bridge rectifier means, and a pair of output terminals for transmitting the DC power supply.

4. The converter system defined in claim 1 wherein said control means includes a gated switch connected to said rectifier means for providing a variable DC power supply.

5. The converter system defined in claim 4 wherein said gated switch is a MOSFET.

6. The converter system defined in claim 4 wherein said gated switch is an insulated gate bipolar transistor.

7. The converter system defined in claim 4 wherein said control means includes a gating generator for controlling the gate on said switch.

8. The converter system defined in claim 7 wherein the gating generator includes a pulse width modulator, and a multiplier for generating an input signal to the pulse width modulator.

9. The converter system defined in claim 8 wherein the signal generated by the multiplier includes the multiplication of a rectified line voltage signal times the product of a feedback control signal times a ripple feedback signal ratio.

10. The converter system defined in claim 9 wherein the feedback control signal is provided by an output voltage feedback system.

11. The converter system defined in claim 9 wherein the feedback control signal is provided by an output current feedback system.

12. The converter system defined in claim 1 wherein said filter means includes an inductor connected in series with the load and a capacitor connected in parallel with the load for filtering switching-frequency and twice-line-frequency currents.

13. The converter system defined in claim 1 wherein said nonlinear ripple feedback means includes a nonlinear circuit for multiplication and division.

14. The converter system defined in claim 13 wherein said nonlinear ripple feedback means includes a means for sensing the DC output current, the DC current being separated into a first current signal which is low-pass filtered to remove switching frequency and a second current signal which is low-pass filtered to remove all components related to AC line frequency.

15. The converter system defined in claim 14 wherein said nonlinear ripple feedback means includes a circuit for dividing the second current signal by the first current signal to create a ripple feedback signal ratio and multiplying the ripple feedback signal ratio times a feedback control signal.

16. The converter system defined in claim 14 wherein said means for sensing the DC current includes a DC current sensor.

17. The converter system defined in claim 14 wherein said means for sensing the DC current includes a sensor with a low pass filter.

18. An AC to DC converter system for supplying DC electrical power to a load, comprising:
   a) input means for receiving an AC power supply having an AC line frequency;
   b) filter means connected to said input means for suppressing the transmission of a switching frequency current to the AC power supply;
   c) a current-sourced rectifier bridge connected to said filter means for converting the AC power supply to a DC power supply for transmittal to a load;
   d) a filter connected between said rectifier bridge and the load for providing the energy storage required for unity power factor operation;
   e) a gated switch connected to said rectifier bridge for providing a variable DC power supply;
   f) control means, including a pulse width modulator provided with a standard feedback system, connected to said gated switch for controlling the DC power supply transmitted to the load;
   g) ripple feedback means connected to said control means for sensing the DC output current, the sensed current being separated into a first current signal which is low-pass filtered to remove switching frequency and a second current signal which is low-pass filtered to remove all components related to AC line frequency, said nonlinear ripple feedback means including a circuit for dividing the second current signal by the first current signal to create a ripple feedback signal ratio and multiplying the ripple feedback signal ratio times a feedback control signal; and
   h) a multiplier for generating an input signal to the pulse width modulator, the signal being determined by the multiplication of a rectified line voltage signal times the product of the feedback control signal times the ripple feedback signal ratio, whereby the oscillation and sensitivity of the converter system is reduced, and a low-distortion AC line current waveform is maintained regardless of the DC-side ripple current magnitude.

* * * * *